United States Patent [19]

Brody

[11] Patent Number: 4,726,639
[45] Date of Patent: Feb. 23, 1988

[54] OPTICALLY IMPLEMENTED MEMORY CORRELATOR USING A PHOTOREFRACTIVE CRYSTAL

[75] Inventor: Philip S. Brody, Bethesda, Md.

[73] Assignee: The United States of America as represented by the Secretary of the Army, Washington, D.C.

[21] Appl. No.: 824,989

[22] Filed: Feb. 3, 1986

[51] Int. Cl.⁴ .................. G03H 1/02; G06G 9/00
[52] U.S. Cl. .................. 350/3.64; 350/162.13; 350/162.14; 364/822
[58] Field of Search ............ 350/3.64, 162.13, 162.14; 364/821, 822

[56] References Cited

U.S. PATENT DOCUMENTS

| | | | |
|---|---|---|---|
| 3,597,045 | 8/1971 | Mathisen | 350/162.14 |
| 3,694,657 | 3/1971 | Brooks | 364/822 |
| 4,284,324 | 8/1981 | Huignard | 350/3.64 |
| 4,523,293 | 6/1985 | Auld et al. | 364/819 |
| 4,592,009 | 5/1986 | Mashoff | 364/819 |

Primary Examiner—Bruce Y. Arnold
Attorney, Agent, or Firm—Saul Elbaum; Alan J. Kennedy; Tomas E. McDonald

[57] ABSTRACT

An optically implemented technique which generates the correlation function of two electrical signals. A reference signal is used in conjugation with an acousto-optic device to generate an optical field which is incident on a photorefractive crystal. This produces in the crystal a reflection phase conjugate wave front reconstructing volume hologram. A retropropagating reconstructed optical field passes back through the device which contains a second signal. This optical field is then focused onto a photodiode. The time varying component of the photodiode output is the correlation of the two signals.

18 Claims, 2 Drawing Figures

OPTICALLY IMPLEMENTED MEMORY CORRELATOR USING A PHOTOREFRACTIVE CRYSTAL

RIGHTS OF THE GOVERNMENT

The invention described herein may be manufactured and used by or for the United States Government for governmental purposes without the payment to me of any royalty thereon.

BACKGROUND OF THE INVENTION

The high speed computation of the correlation between audio or radio frequency signals is an important signal processing operation. An optically implemented analog device which accomplishes this is described in this disclosure. Other optically implemented devices have been described previously. In one reference the waveform of a reference radio frequency signal is displayed as a spatially varying stationary refractive index pattern in a surface acoustic wave acousto-optic device. The electro-optic effect is used to produce the index changes; the electric fields are produced with programmed voltages on finger electrodes. See, "An Integrated Optical Spatial Filter," by C. M. Verber, R. P. Kenan and J. R. Bush, Optics Communications, Volume 34, Number 1, pages 32–34 (1980). In another reference, an index of refraction pattern is created in the same type of acousto-optic device by the interaction of the moving refractive index pattern produced by the acoustic wave and a short duration intense pulse of coherent illumination. The effect is to convert the moving pattern at the moment of illumination into a stationary pattern. See U.S. Pat. No. 4,139,277 to Berg et al, and "A New Acoustophotorefractive Effect in Lithium Niobate", by N. J. Berg, B. J. Udelson, and J. N. Lee, Applied Physics Letters, Volume 31, Number 9, pages 555–557, (November, 1977). In these devices the correlation is obtained from a coherent optical input after being diffracted (simultaneously) by the stationary pattern stored in the optical substrate of the device, and by a moving pattern produced with a second signal.

The present invention is a device which differs from these references in the method of storing the reference signal and in the method of the analog computation of the correlation. The reference signal is not stored as a refractive index pattern within the substrate of an acousto-optic device. Rather the moving pattern created by the reference signal diffracts a short duration pulse coherent optical input, producing an optical field containing the signal phase and amplitude at the moment of illumination. This field is then incident on a photorefractive crystal. This input produces in the crystal a volume phase hologram which persists for some interval of time. The hologram is of a kind which reconstructs, not the original field, but the optical phase conjugate of this field. To obtain the correlation optical output this phase conjugate field is reconstructed. It passes back through the acousto-optic device where it is diffracted by a second signal. The electrical signal proportional to the correlation function is then obtained from the optical output using a lens and a photodiode.

This analog computation method of the present invention is related to a holographic method for aberration removal. In this process a hologram, produced in a photographic medium, is that of an optical field distorted by a phase distorting object such as pebble surface glass. From this hologram, a phase conjugate of the input optical field is reconstructed. This optical field passes back through the phase object, where the object and hologram, are repositioned exactly as they were at the time the hologram was made. The effect of the distorter is then to remove the distortions in the phase conjugate field. This field, a back propagating version of the original distorted field is now observed undistorted. See, "Holographic Imagery Through Diffusing Media," Journal of the Optical Society of America, Volume 56, Number 4, page 523 Emmet Leith and Juris Upatneik, Journal (April 1966). In the present invention there is an analog to the distorter in the form of the acousto-optic device with an index of refraction pattern produced by the reference electrical signal. A phase conjugating phase volume hologram is produced in the photorefractive crystal. A reconstructed phase conjugate field passes back through the optical device where it is diffracted by a new index of refraction pattern produced by a second electrical input. If the second input signal is identical to the first there will appear in the acousto-optic device a second index of refraction pattern identical to the first. The first of this pattern will be to remove the diffraction effects in the phase conjugate field that resulted from the reference electrical signal. The result is a phase conjugate version of the original undistorted field that was incident on the device back propagating from it. If the input was an undistorted plane wave, the output is an undistorted plane wave—the aberration is removed. Such a plane wave front propagating optical field will be focused by a spherical lens to a maximum intensity, diffraction limited spot. This peak is proportional to the auto correlation function peak.

The index pattern is moving and the intensity peak occurs when the pattern and phase conjugate reconstruction of the original pattern are spatially congruent. As the index pattern moves across the reconstruction other intensity values corresponding to values of the autocorrelation as a function of the relative shift appear. The autocorrelation function is thus generated. For signals which are different the crosscorrelation function is generated.

OBJECTS OF THE INVENTION

It is an object of this invention to present an optically implemented technique which generates the correlation function of two electrical signals.

It is a further object to utilize a reference signal in conjunction with an acousto-optic device to generate an optical field which is incident on a photorefractive crystal to produce in the crystal a reflection phase conjugate wave front reconstructing volume hologram.

It is a further object to pass the retropropagating reconstructed optical field generated by the photorefractive crystal back through the acousto-optic device which contains a second signal.

Lastly, it is an object to focus the retropropagating reconstructed optical field, after it has passed through the acousto-optic device, onto a photodiode because the time varying component on the output of the photodiode is the correlation of the two signals.

THE DRAWINGS

SUMMARY OF THE INVENTION

Figure 1:
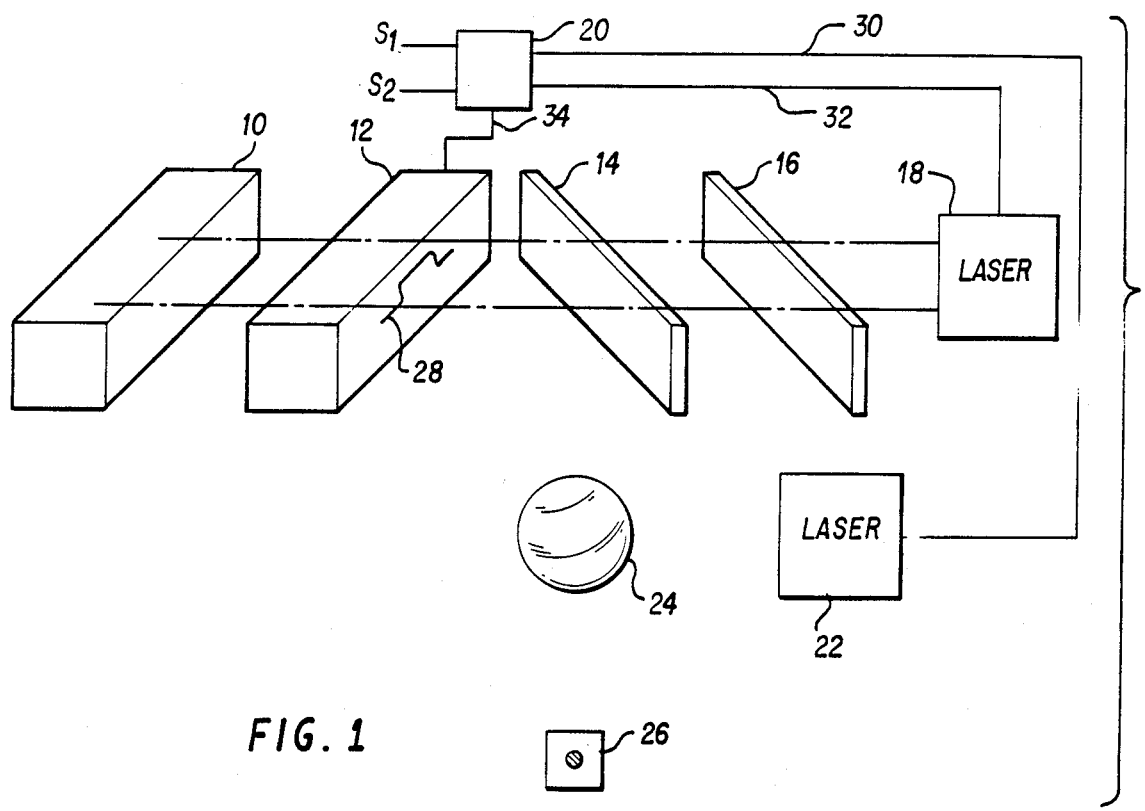
FIG. 1 illustrates the preferred embodiment of the invention with the short pulse laser operating.

A reference electrical signal is converted to a propagating reference optical field when a short pulse coherent output of a pulse laser passes through an acousto-optic device such as a lithium niobate delay line or a bulk wave Bragg cell. The short duration optical input into the device propagates through the acousto-optically generated index of refraction pattern produced in the device by an input reference signal, and then falls directly incident upon on a photorefractive crystal. The duration of the optical pulse is short compared to the time variations of the index pattern. The incident field produced from the index of refraction pattern $n_1(x)$ in the device at the moment of pulse illuminations, contains the wave form information of the input reference signal between two values of time. The photorefractive crystal records this optical field in a phase conjugate reconstructing reflection volume phase hologram. The hologram recording process is called self phase conjugation. Sometimes it is referred to as phase conjugation by self pumped four wave mixing in a photorefractive crystal. See, J. Feinberg "Self Pumped Continuous-wave Phase Conjugator Using Internal Reflection," Opt. Lett. Volume 7 page 486 (1982). Once the hologram forms, the phase conjugate optical field is reconstructed with a second coherent optical input propagating in the same direction as the original pulse input and characterized by the same wavelength. This input can be pulsed repetitively or continuous. It however, must be limited in total optical energy with the total energy less than the total optical energy used to record the hologram. This is so that the second coherent optical input does not significantly alter the already recorded hologram. This energy limited reconstruction excitation passes through the device and again is directly incident upon the crystal and excites from the hologram in the crystal a time invarient phase conjugate reconstruction of the original optical field containing the wave form information from the signal $f_1(t)$, $t_1 < t < t_2$. The reconstruction retropropagates passing back through the acousto-optic device where it is now diffracted by a new (moving) index of refraction pattern in the device created by a second electrical input $f_2(t)$. The diffracted reconstructed field is collected by a spherical lens and focused into a photodiode detector the output of which is proportional to the intensity of the field at the focus. The time varying portion of the detector output is proportional to the correlation function of the two signals and may be displayed on an oscillograph screen.

The apparatus for generating the correlation function of the two signals includes a photorefractive crystal, a short pulse laser of first wavelength, a first beam splitter disposed between the photorefractive crystal and the short pulse laser, a second beam splitter, and an acousto-optic device disposed between the photorefractive crystal and the second beam splitter. A first radio frequency signal of first duration is introduced into an acousto-optic device. The short pulse laser is triggered when the first radio frequency signal is introduced into the acousto-optic device such that the short pulse laser first illuminates the acousto-optic device and then illuminates the photorefractive crystal to produce a saturation phase conjugate generating volume phase hologram in the photorefractive crystal. After the duration of the first radio frequency signal a second radio frequency is introduced into the acousto-optic device. A low intensity laser of first wavelength is triggered when the second radio frequency signal is introduced into the acousto-optic device such that the laser beam is reflected off of the first beam splitter and through the second beam splitter to first illuminate the acousto-optic device and then the photorefractive crystal to produce a back propagating wave which illuminates the acousto-optic device and is reflected off the second beam splitter and is focused by a lens onto a photodiode detector. The photodiode detector detects the correlation function of the first radio frequency signal and the second radio frequency signal from the back propagating beam.

DESCRIPTION OF THE PREFERRED EMBODIMENT

As illustrated in FIG. 1, a first radio frequency signal $S_1$ is introduced into acousto-optic device 12 by means of a signal and optical pulse synchronization means 20 and electrical cable 34. The signal $S_1$ produces an index of refraction pattern, represented by 28, in acousto-optic device 12. At the same time that the index of refraction pattern 28 is produced in acousto-optic device 12 the signal and optical pulse synchronization means 20 triggers a very short pulse of laser light from short pulse laser 18 by means of electrical cable 32. The short pulse of laser light from short pulse laser 18 passes through first beam splitter 16, second beam splitter 14, and though acousto-optic device 12 into photorefractive crystal 10. The first radio frequency signal $S_1$ may be introduced into the acousto-optic device 12 periodically at times $t_1$, $t_2$, $t_3$. . . producing index of refraction patterns 28 in the acousto-optic device 12 (in the identical position) at which time signal and optical pulse synchronization means 20 and short pulse laser 18 produce periodic short laser pulses until the effect of the periodic optical inputs incident on the photorefractive crystal 10 produces a saturation phase conjugate generating volume phase hologram in photorefractive crystal 10. At this time the recording pulses from short pulse laser 18 cease.

Figure 2:
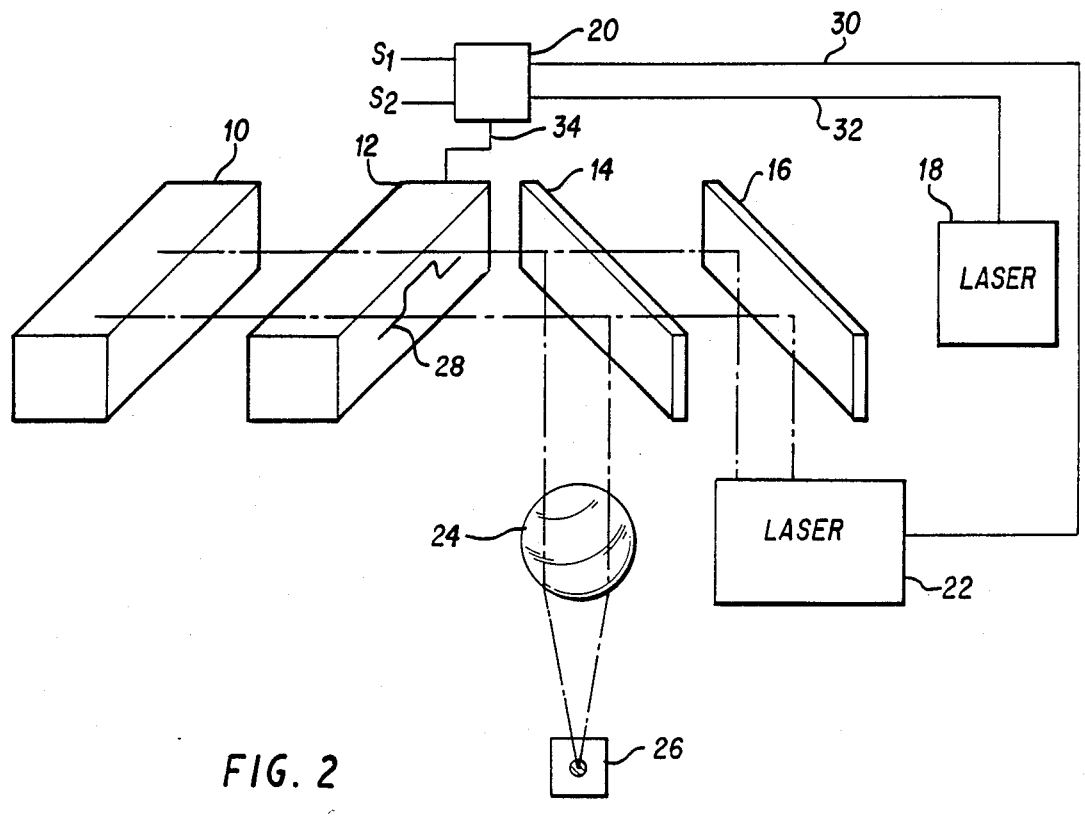
FIG. 2 illustrates the preferred embodiment of the invention with the low intensity laser operating.

A second radio frequency signal $S_2$ is then introduced into acousto-optic device 12 by means of signal and optical pulse synchronization means 20 and of electrical cable 34. The signal $S_2$ produces an index of refraction pattern represented by 28, in acousto-optic device 12. At the same time that the index of refraction pattern 28 is produced in acousto-optic device 12 the signal and optical pulse synchronization means 20 triggers a low intensity continuous laser 22, as shown in FIG. 2, by means of electrical cable 30. The wavelength of the low intensity laser 22 is the same as the wavelength of the short pulse laser 18. The laser beam from laser 22 reflects off of first beam splitter 16, passes through second beam splitter 14, and through acousto-optic device 12 into photorefractive crystal 10 to produce a back propagating beam which is the phase conjugate of the original incident beams produced by short pulse laser 18. The back propagating beam passes through the acousto-optic device 12 which has the index of refraction pattern produced by second radio frequency signal $S_2$ in it and is reflected by second beam splitter 14 into spherical lens 24. Spherical lens 24 focuses the back propagating beam onto photodiode detector 26 which produces the correlation function waveform. Optical elements, not illustrated, can be positioned between acousto-optic device 12 and photorefractive crystal 10, but this is not necessary as photorefractive crystal 10 is sufficiently large in acceptance area and sufficiently close to acousto-optic device 12.

To understand how the invention works, consider a phase conjugate version of a propagating optical field. This is a field in which the phase fronts are identical to that of the original field, but the propagation direction of the fronts are reversed. The wave fronts of the phase conjugate field move so that the ray paths of the original fields appear counterpropagating—tracing back the original paths. The phase conjugate field is thus the time reversed original field. The retracing of the ray paths is exact even when the propagating medium is described by an arbitrary spatially varying index of refraction pattern. Consider the steps in the process. (1) The index of refraction pattern created by a reference signal diffracts a coherent pulse optical input. A hologram is produced in the recording medium. (2) This hologram is excited to produce a reconstructed field which is the phase conjugate of the original diffracted field. This field passes back through the acousto-optic device. During this passage it is diffracted by the moving index of refraction pattern produced by a second input. The output is then collected by the lens.

To calculate the intensity at the focus of the lens consider the phase conjugate of the original field propagating back through the moving refractive index pattern. The complex light field at the input plane of the acousto-optic cell for the back propagating fronts is, $$A^* e^{i[kz_0 + k[n_1(x) + (n_0 - 1)]z_0]} \quad (1)$$

for an initial forward propagating input into the cell of complex amplitude A with plane fronts of constant phase wt-kz propagating in the +z direction. K is the wave vector, $n_o$ the cell medium index of refraction, $n_1(x)$ the incremental variation in the index of refraction generated by the rf wave form segment, and $z_o$ the cell thickness in the propagation direction. In the output plane of the cell for the back propagating output the field is then $$A^* e^{ik[n_1(x) - n_2(x - vt)z_0]} \quad (2)$$

where $n_2(x-vt)$ is the incremental index pattern produced by the second rf input which moves at the cell acoustic velocity v. The effect of the lens is to sum at its focus spatial elements which are the real parts of the complex optical field at the input plane of the lens which is also assumed to be the output plane of the acousto-optic cell. The resulting amplitude of the field at the focus is then $$|A| \int_0^{x_o} \cos k[(n_1(x) - n_2(x - vt)]z_o dx \quad (3)$$

where $x_o$ is the lateral extent of the optical field. We expand for small arguments of the harmonic function and drop terms of order greater than the two to obtain the expression, $$|A| \left[ \int_0^{x_o} dx - \tfrac{1}{2}k^2 z_o^2 \int_0^{x_{o2}} n_1(x)dx - \right. \quad (4)$$

$$\left. \tfrac{1}{2}k^2 z_o^2 \int_0^{x_{o2}} n_2(x - vt)dx + k^2 z_o^2 \int_0^{x_o} n_1(x)n_2(x - vt)dx \right].$$

The first two terms are constant backgrounds, the third term generally will not be a strong function of time with contributions to the integral only as refractive element enters and leaves the optical field. Because the primary components of the signal will be harmonic in content the magnitude of this average will generally be small. The last term is the integral correlation function and strongly depends in the relative shift, vt. The photodiode measures the intensity rather than the field amplitude. The measured intensity is proportional to the square of expression for the electric field amplitude. The leading terms for the intensity, where we have represented the first three terms in equation 4 as B are then $$B^2 + 2|A|Bk^2 z_o^2 \int_0^x n_1(x)n_2(x - vt)dx. \quad (5)$$

Thus the photodiode output is primarily composed of a background term plus a term proportional to the integral correlation function.

To record and reconstruct the requisite phase conjugate reconstructing hologram we use a short pulse laser input and a photorefractive crystal in which the hologram can be generated by self conjugating. In photorefractive crystals the direct input of an optical field can result in the appearance of the phase conjugate retropropagating field after an evolution time. Both barium titanate and barium strontum niobate crystals are presently known to function in this manner when these are oriented or cut to enhance the strength of the photorefractive effect in the crystal. The self conjugated optical field increases to a saturation value at which time the volume of the crystal contains a semipermanent grating-like refractive structure which can be described as a reflection volume conjugate phase reconstructing phase hologram. After formation the hologram persists, for a time interval of after the original incident optical field is removed. This interval can be short or long depending on crystal characteristics and ambient conditions. The retropropagating phase conjugate optical field reappears immediately if within this interval the original optical field is incident on the crystal. It is important to know also that a perturbed version of the original optical field will also result in the appearance of the reconstructed phase conjugate field although at a lower overall intensity. This is a characteristic of volume phase holograms. Volume phase holograms are selective in nature reconstructing a field from a range of optical inputs which fulfill Bragg conditions locally for the volume grating. Thus, the original field is reconstructed with an optical excitation field which passes through the device slab at the time a new signal produces a moving pattern $n_2(x-vt)$ despite the fact the phase pattern of the excitation input into the crystal has been modified by its passage through the new index of refraction pattern.

The hologram has been described as being produced by a single short duration illumination pulse through the device containing the pattern $n_1(x)$. The pulse duration is short so that the index of refraction pattern produced by the reference signal moves only a small distance during the duration of the illumination pulse. In principle a single short pulse can be used to record the hologram. If, however, the sensitivity of the crystal is insufficient, or the energy in the coherent pulse input is inadequate, or if the medium cannot record at very high intensities, then a series of multiple low energy pulse can be used to record the hologram. The optical field of each of these pulses must be identical in form to that produced by the single more intense pulse. Such fields can be produced by generating the optical pulse inputs and reference signal synchronously and delaying the optical pulse precisely so that the index of refraction patterns $n_1(x-vt)$ are correctly positioned at the moment of the pulse illumination.

While the invention has been described to make reference to the accompanying drawings, I do not wish to be limited to the details shown therein as obvious modifications may be made by one of ordinary skill in the art.

I claim:

1. Apparatus for generating the correlation function of two signals comprising:
   a photorefractive crystal;
   a short pulse laser of first wavelength;
   a first beam splitter disposed between said photorefractive crystal and said short pulse laser;
   a second beam splitter disposed between said photorefractive crystal and said first beam splitter;
   an acousto-optic device disposed between said photorefractive crystal and said second beam splitter;
   means for introducing a first radio frequency signal of first duration into said acousto-optic device;
   means for triggering said short pulse laser when said first radio frequency signal is introduced into said acousto-optic device such that said short pulse laser first illuminates said acousto-optic device and then illuminates said photorefractive crystal to produce a phase conjugate generating volume phase hologram in the photorefractive crystal;
   means for introducing, after the duration of said first radio frequency signal, a second radio frequency signal into said acousto-optic device;
   a low intensity laser of first wavelength;
   means for triggering said low intensity laser when said second radio frequency signal is introduced into said acousto-optic device such that the laser beam is reflected off of said first beam splitter and through said second beam splitter to first illuminate said acousto-optic device and then said photorefractive crystal to produce a back propagating wave which then illuminates said acousto-optic device and is reflected off of said second beam splitter;
   photodiode detector means for detecting the correlation function of the first radio frequency signal and the second radio frequency signal from the back propagating beam reflected off of said second beam splitter; and
   means for focusing said back propagating beam reflected off of said second beam splitter onto said photodiode detector.

2. The device of claim 1, wherein said acousto-optic device comprises a surface acoustic wave delay line.

3. The device of claim 1, wherein said acousto-optic device comprises a bulk wave Bragg cell.

4. The device of claim 1, wherein the total optical energy incident on said photorefractive crystal by said low intensity laser of first wavelength is less than the total optical energy incident on said photorefractive crystal by said short pulse laser of first wavelength.

5. The device of claim 1 wherein said photorefractive crystal is comprised of barium titanate.

6. The device of claim 1 wherein said photorefractive crystal is comprised of barium strontium niobate.

7. The device of claim 1 wherein said low intensity laser is continuous.

8. The device of claim 1 wherein said low intensity laser is pulsed.

9. The device of claim 1 wherein said low intensity laser is repetitively pulsed.

10. Method for generating the correlation function of two signals comprising:
    introducing a first radio frequency signal of first duration into an acousto-optic device;
    triggering a short pulse laser of first wavelength when said first radio frequency signal is introduced into said acousto-optic device such that said short pulse laser first illuminates said acousto-optic device and then illuminates a photorefractive crystal to produce a saturation phase conjugate generating volume phase hologram in the photorefractive crystal;
    introducing, after the duration of said first radio frequency signal, a second radio frequency signal into said acousto-optic device;
    triggering a low intensity laser of first wavelength when said second radio frequency signal is introduced into said acousto-optic device such that said low intensity laser first illuminates said acousto-optic device and then illuminates said photorefractive crystal to produce a back propagating beam which illuminates said acousto-optic device; and
    directing said back propagating beam, after it has illuminated said acousto-optic device, through a lens so as to focus said back propagating beam onto means for detecting the correlation function of the first radio frequency signal and the second radio frequency signal.

11. The method of claim 10 wherein said acousto-optic device comprises a surface acoustic wave delay line.

12. The method of claim 10 wherein said said acousto-optic device comprises a bulk wave Bragg cell.

13. The method of claim 10 wherein the total optical energy incident on said photorefractive crystal by said low intensity laser of first wavelength is less than the total optical energy incident on said photorefractive crystal by said short pulse laser of first wavelength.

14. The method of claim 10 wherein said photorefractive crystal is comprised of barium titanate.

15. The method of claim 10 wherein said photorefractive crystal is comprised of barium strontium niobate.

16. The method of claim 10 wherein said low intensity laser is pulsed.

17. The method of claim 10 wherein said low intensity laser is continuous.

18. The method of claim 10 wherein said low intensity laser is repetitively pulsed.

* * * * *